United States Patent

Ulanoski et al.

[11] Patent Number: 6,105,901
[45] Date of Patent: Aug. 22, 2000

[54] THRUST VECTORING SYSTEM

[75] Inventors: Michael S. Ulanoski, Louisville, Ky.; Jagdish S. Sokhey, Loveland, Ohio

[73] Assignee: Allison Engine Co., Inc., Indianapolis, Ind.

[21] Appl. No.: 09/055,663

[22] Filed: Apr. 6, 1998

Related U.S. Application Data

[63] Continuation of application No. 08/692,017, Aug. 2, 1996.
[51] Int. Cl.[7] .............................. B64C 29/00; F02K 1/00
[52] U.S. Cl. ........................ 244/23 A; 244/23 D; 60/228
[58] Field of Search ................................. 244/12.3, 12.4, 244/12.5, 23 R, 23 A, 23 B, 23 C, 23 D, 51, 52, 110 B; 60/228, 230, 232; 239/265.19, 265.25, 265.39

[56] References Cited

U.S. PATENT DOCUMENTS

| | | |
|---|---|---|
| 2,502,045 | 3/1950 | Johnson . |
| 2,930,544 | 3/1960 | Howell . |
| 2,989,269 | 6/1961 | Le Bel . |
| 3,099,423 | 7/1963 | Wilde et al. . |
| 3,179,353 | 4/1965 | Peterson . |
| 3,206,929 | 9/1965 | Marchant et al. ...................... 60/35.55 |
| 3,397,852 | 8/1968 | Katzen . |
| 3,545,209 | 12/1970 | Millward . |
| 3,640,469 | 2/1972 | Hayes et al. ............................. 239/265 |
| 3,912,201 | 10/1975 | Bradbury ................................. 244/23 |
| 4,018,046 | 4/1977 | Hurley ..................................... 60/264 |
| 4,162,040 | 7/1979 | Carey ................................. 239/265.33 |
| 4,205,813 | 6/1980 | Evans et al. ........................... 244/12.5 |
| 4,241,876 | 12/1980 | Pedersen ................................ 239/265 |
| 4,474,345 | 10/1984 | Musgrove ................................. 244/53 |
| 4,587,806 | 5/1986 | Madden ................................... 60/271 |
| 4,606,499 | 8/1986 | Langley, Jr. ............................ 239/11 |
| 4,798,328 | 1/1989 | Thayer et al. ............................ 239/1 |
| 4,805,401 | 2/1989 | Thayer et al. ........................ 60/226.2 |
| 4,828,203 | 5/1989 | Clifton et al. ........................ 244/12.3 |
| 4,836,451 | 6/1989 | Herrick et al. ...................... 239/265.27 |
| 4,948,072 | 8/1990 | Garland et al. ........................ 244/12.5 |
| 5,039,014 | 8/1991 | Lippmeier ........................... 239/265.39 |
| 5,209,428 | 5/1993 | Bevilaqua et al. ..................... 244/12.3 |
| 5,294,055 | 3/1994 | Garrett et al. ..................... 239/265.19 |
| 5,328,098 | 7/1994 | Barcza et al. ...................... 239/265.39 |
| 5,464,175 | 11/1995 | Short . |
| 5,485,958 | 1/1996 | Nightingale ........................ 239/265.19 |
| 5,571,262 | 11/1996 | Camboulives ..................... 239/265.39 |
| 5,630,564 | 5/1997 | Speicher et al. . |
| 5,687,907 | 11/1997 | Holden . |
| 5,690,280 | 11/1997 | Holowach et al. ................ 239/265.19 |
| 5,694,766 | 12/1997 | Smereczniak et al. . |
| 5,706,649 | 1/1998 | Robinson et al. . |
| 5,769,317 | 6/1998 | Sokhey et al. ............................. 239/1 |

FOREIGN PATENT DOCUMENTS 1018581  1/1966  United Kingdom .

*Primary Examiner*—Peter M. Poon
*Assistant Examiner*—Charles R. Ducker, Jr.
*Attorney, Agent, or Firm*—Woodard, Emhardt, Naughton Moriarty & McNett

[57] ABSTRACT

A thrust directing mechanism to vector thrust and control discharge throat area with a number of vanes mounted across the passage. The mechanism includes a control link pivotally coupled to each of the vanes. The control link is selectively movable to correspondingly pivot the vanes and has at least two degrees of freedom corresponding to a two coordinate position. A desired orientation of the vanes may be determined as a function of the two coordinate position. The discharge exit area is contracted by adjusting convergence of the vanes. During convergence, the vanes are pivoted to various pivot angles selected to optimize thrust efficiency when contracting the throat area.

44 Claims, 7 Drawing Sheets

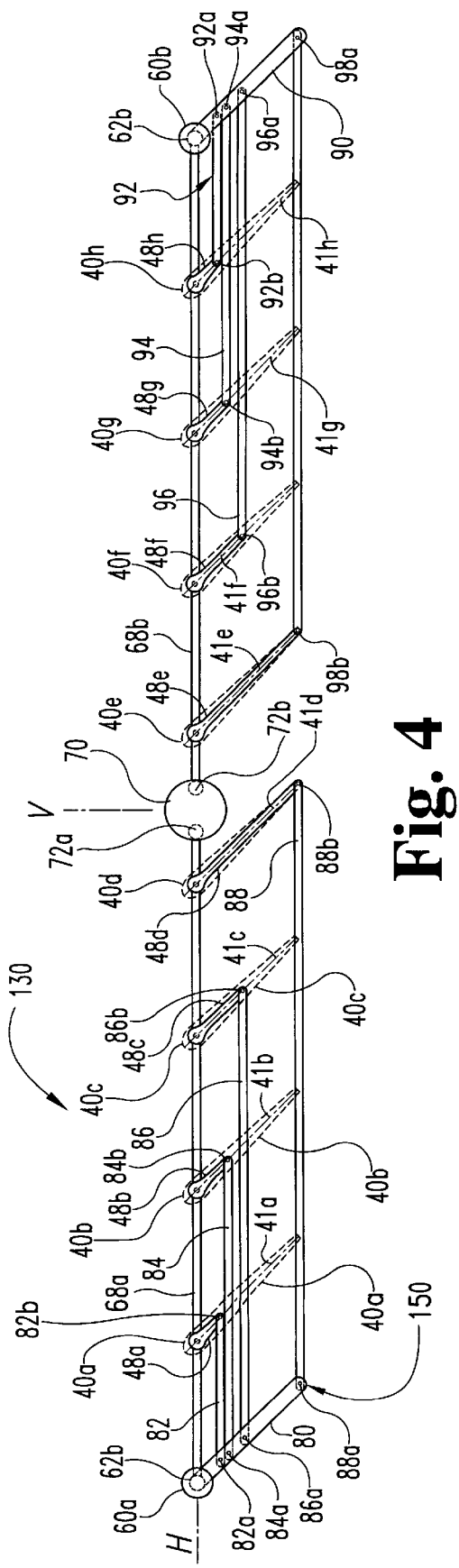
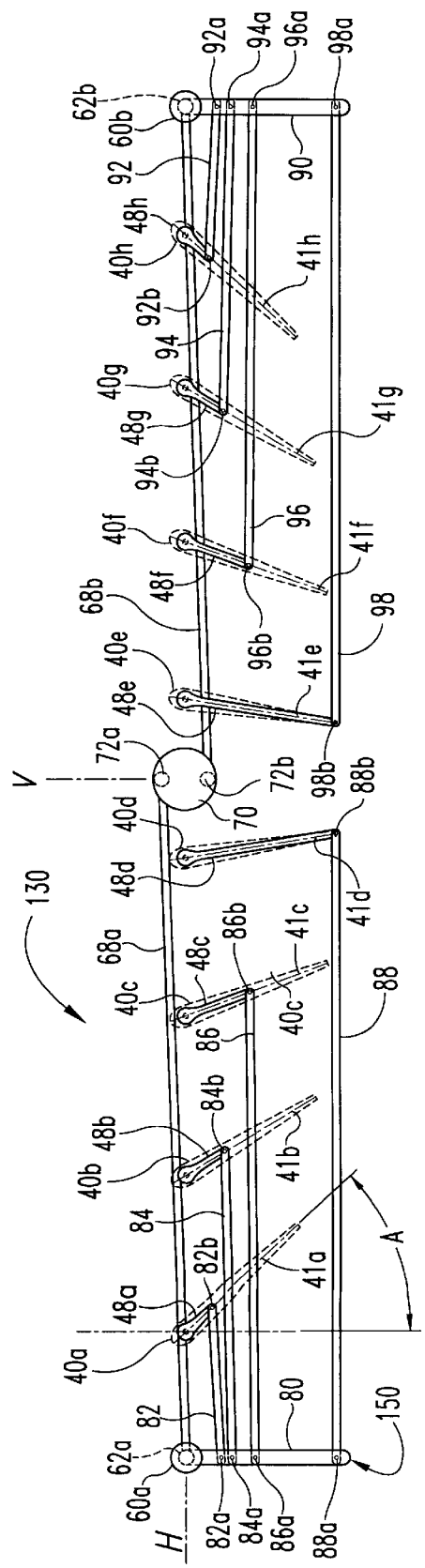
Fig. 4
Fig. 5

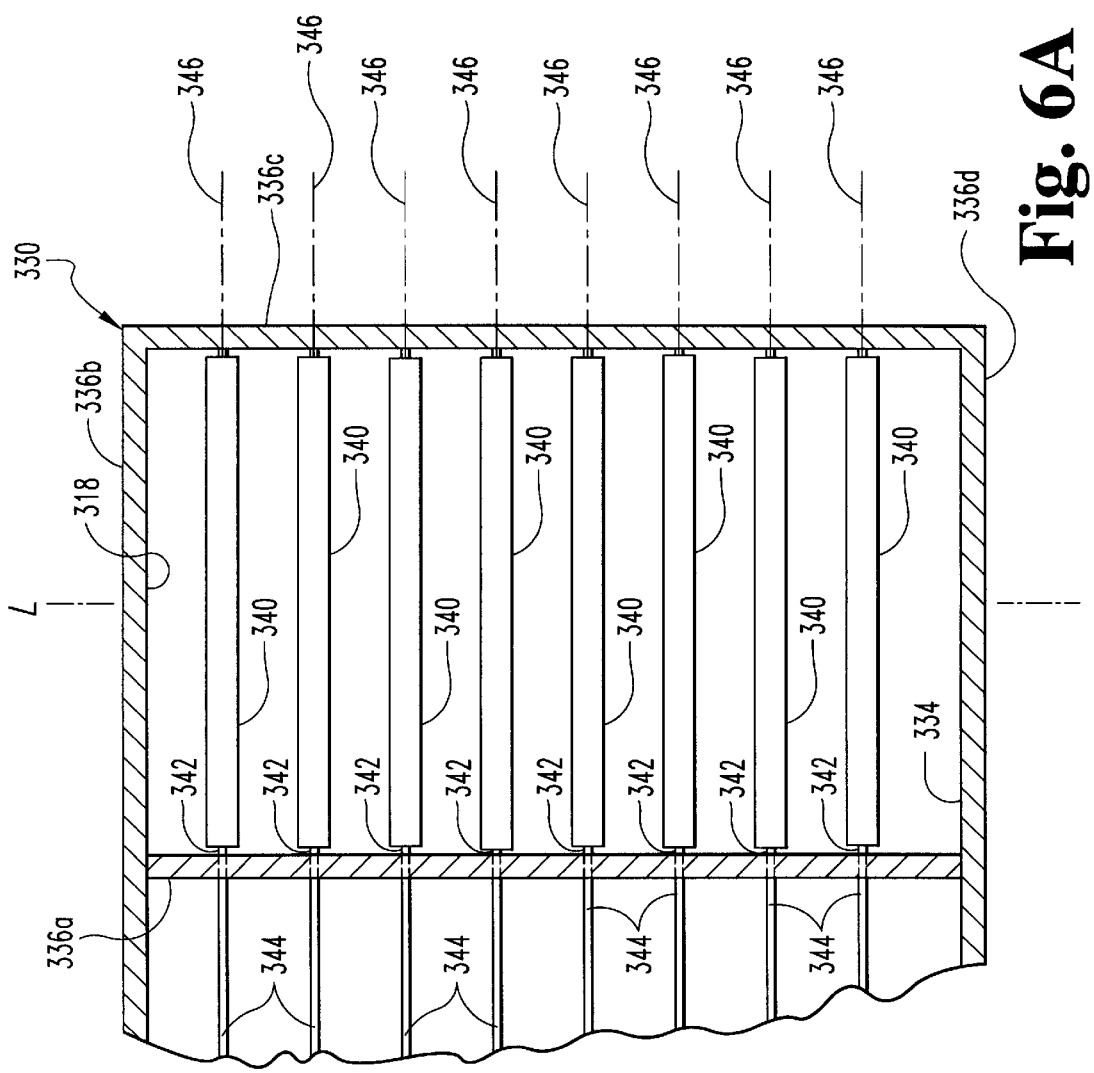

THRUST VECTORING SYSTEM

This application is a continuation of Ser. No. 08/692,017 Aug. 2, 1996.

BACKGROUND OF THE INVENTION

The present invention relates to a system and method for operating a guide vane bank, and more particularly, but not exclusively, relates to a mechanism to control thrust vectoring and nozzle throat area with variable pitch guide vanes.

Typically, a jet powered aircraft is controllably propelled by thrust substantially parallel with and in a direction opposite working fluid exiting a nozzle. Consequently, if the direction of the working fluid is changed, the direction of propulsive thrust and the aircraft direction is corresponding varied. As used herein, "nozzle" means an aircraft passage or outlet for discharging working fluid to produce thrust.

With the advent of vertical or short take off and vertical landing (V/STOVL) aircraft, the need for efficient, uninterrupted vectoring of thrust has arisen. The hot gasses exhausted from a gas turbine engine are one source of working fluid which may be vectored. Alternatively, "cold flow" from a lift fan may also serve as a working fluid source. Such a lift fan is typically driven indirectly by a coupling to a gas turbine engine. U.S. Pat. No. 5,209,428 to Bevilaqua et al. is cited as a source of further information concerning lift fan aircraft.

For the V/STOVL mode of aircraft operation, a continuous, uninterrupted vectoring of thrust is required throughout a wide angular range to provide lift for the aircraft. Also, a smooth and reliable transition to a horizontal cruise mode is often required. Moreover, as with most aircraft equipment, thrust vectoring systems generally must be lightweight, reliable, and compact, occupying as little space as possible. U.S. Pat. Nos. 5,485,958 to Nightingale; 3,397,852 to Katzen; 3,179,353 to Peterson; and 2,989,269 to Le Bel illustrate various guide vane bank arrangements for vectoring thrust.

One typical drawback of these systems is the inability to selectively adjust the exit area presented to working fluid as it passes through the vanes while simultaneously and independently deflecting the exiting working fluid to vector thrust. The ability to select the working fluid exit area or throat area generally improves vectoring system efficiency.

One approach to this problem is to simultaneously adjust vectoring and throat area by using an independently controllable actuator for each vane in the bank. Unfortunately, this approach is often impractical because of the attendant increase in weight, complexity, and space required for the separate actuators.

Thus, there remains a need for a practical system to selectively vary pitch of a number of guide vanes to vector thrust and simultaneously control throat area.

SUMMARY OF THE INVENTION

One feature of the present invention is to discharge working fluid through an aircraft nozzle to produce thrust and control thrust vectoring and nozzle throat area with a number of vanes mounted thereacross.

Another feature of the present invention is pivotally mounting at least three vanes across an aircraft passage to direct flow of discharged working fluid through the passage. Each of the vanes is coupled to a control link that is selectively movable to correspondingly pivot the vanes. The link is moveable with at least two degrees of freedom and has a corresponding two coordinate position. A desired orientation of the vanes may be determined as a function of the two coordinate position. Several control links, each pivotally coupled to a corresponding group of vanes, may be used. In one configuration, position of the link along a first path corresponds to a desired thrust vector, and position of the link along a second path corresponds to a convergent vane orientation providing a desired throat area.

Each of the vanes may have a corresponding linkage arm pivotally connected thereto, with each linkage arm also being pivotally connected to the control link. Also, the link may be selectively moved by an actuator operatively coupled to a controller to pivot the vanes. In one configuration, the controller is responsive to a thrust control signal which corresponds to a desired pivotal orientation of the vanes and provides an actuation signal corresponding to the thrust control signal as a function of the two coordinate position. The actuator responds to this actuation signal to position the link and correspondingly pivot the vanes to the desired pivotal orientation.

Still another feature of the present invention is an aircraft with a passage having an outlet to discharge working fluid to produce thrust with a number of vanes pivotally mounted across the outlet. The vanes include at least a first vane, a second vane mounted adjacent the first vane, and a third vane mounted adjacent the second vane. A thrust control linkage includes a control link spaced apart from the first, second and third vanes. This linkage also includes a first tie rod pivotally coupling the first vane to the link, where the first tie rod has a first length corresponding to a first distance between the link and the first vane. Also, the linkage includes a second tie rod pivotally coupling the second vane to the link. The second tie rod has a second length greater than the first length which corresponds to a second distance between the link and the second vane. The linkage further includes a third tie rod pivotally coupling the third vane to the link. The third tie rod has a third length greater than the second length, the third length corresponding to a third distance between the link and the third vane. The link is actuator controlled to pivot each of the vanes.

A further feature is an aircraft with a passage having an outlet discharging working fluid to produce thrust, and vanes pivotally mounted across the outlet to direct fluid flow therethrough relative to a reference axis. The number of vanes is at least three and includes a first vane configured to pivot about a first axis and a second vane configured to pivot about a second axis. Each of a number of arms are pivotally coupled to a corresponding one of the vanes. There are at least three arms, including a first arm connected to the first vane at a first distance from the first axis, and a second arm pivotally connected to the second vane at a second distance from the second axis. The first distance differs from the second distance by a selected amount. An actuator controlled link is pivotally coupled to each of the number of arms to move along a path to controllably pivot each of the vanes in relation to the reference axis. The link has a first position to controllably pivot the first vane to a first pivot angle and the second vane to a second pivot angle. The first pivot angle is greater than the second pivot angle as a function of the selected amount to provide a desired convergent pattern of the vanes. Preferably, the selected amount optimizes thrust efficiency when the vanes are converged to regulate exit area of working fluid discharged through the outlet.

Accordingly, one object of the present invention is to controllably pivot vanes to vector thrust and adjust vectoring nozzle throat area.

Another object of the present invention is to provide a common control link movable to adjust both vectoring and throat area.

Still another object of the present invention is to control thrust vectoring and throat area with a number of vanes without substantially increasing weight or space requirements.

Further objects, advantages, features, and aspects of the present invention will be apparent from the drawings and discussion herein.

BRIEF DESCRIPTION OF THE DRAWINGS

FIG. 4 is a diagrammatic side view of the embodiment of FIG. 3 with the vanes shown in a second position in phantom.

FIG. 5 is a diagrammatic side view of the embodiment of FIG. 3 with the vanes shown in a third position in phantom.

FIG. 6A is a partial cross-sectional view of a second embodiment of the present invention.

DESCRIPTION OF THE PREFERRED EMBODIMENT

Figure 1:
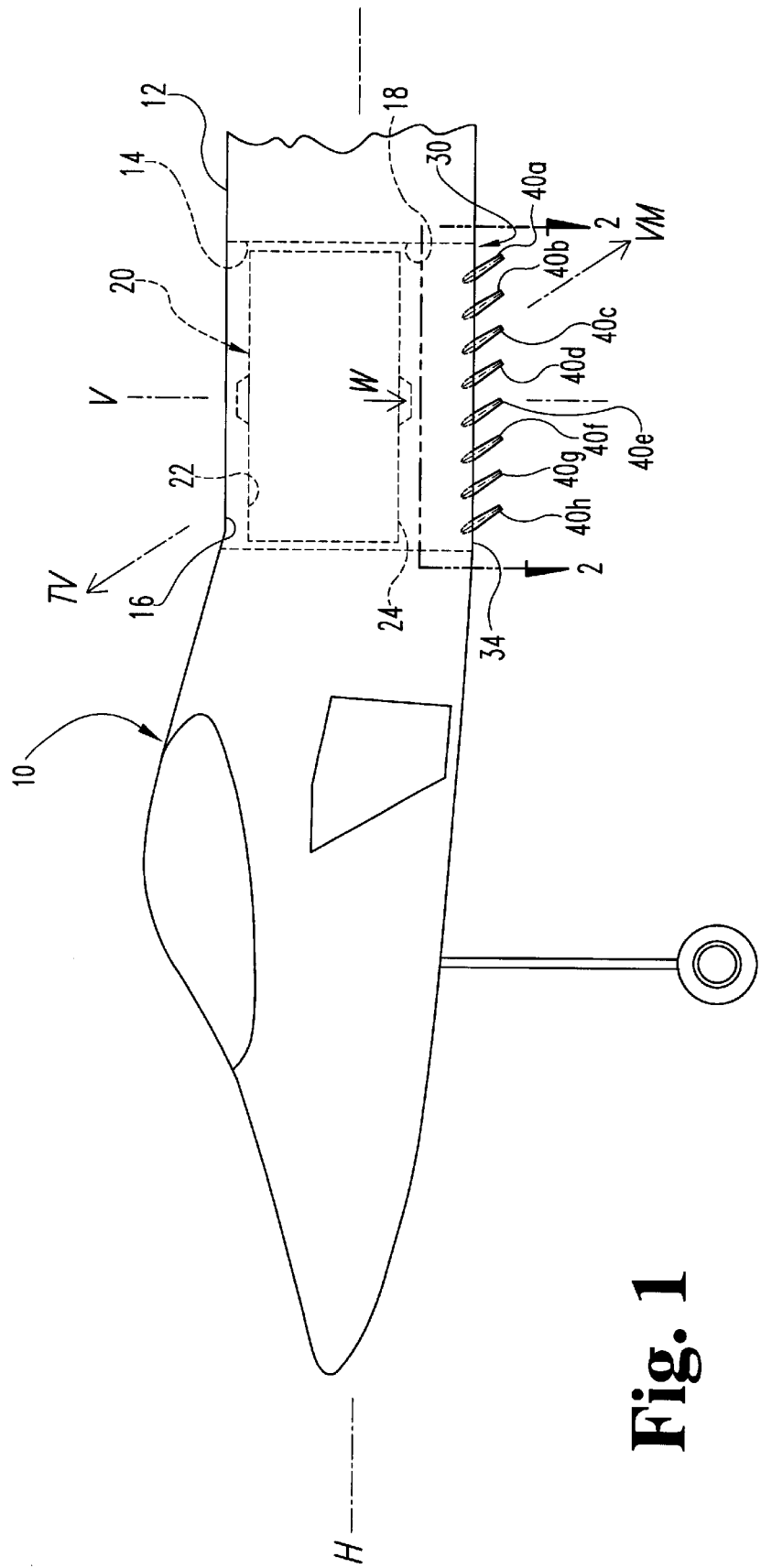
FIG. 1 is a partial, diagrammatic view of an aircraft with thrust vectoring guide vanes of a first embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described device, and any further applications of the principles of the invention as described herein are contemplated as would normally occur to one skilled in the art to which the invention relates.

FIG. 1 illustrates aircraft 10 of a first embodiment of the present invention. Aircraft 10 has fuselage 12 defining cavity 14. Cavity 14 has intake opening 16 and discharge passage 18. Cavity 14 also houses lift engine 20 therein.

Lift engine 20 has inlet 22 and opposing working fluid exit 24. Preferably, lift engine 20 is a gas turbine engine, which receives air through inlet 22 and internally compresses it for discharge as a working fluid through exit 24 along the direction indicated by arrow W to provide thrust. In an alternative embodiment, a remotely driven cold flow lift fan may be utilized instead of a gas turbine engine. In still other embodiments, other types of aircraft thrust sources may be employed.

Figure 2:
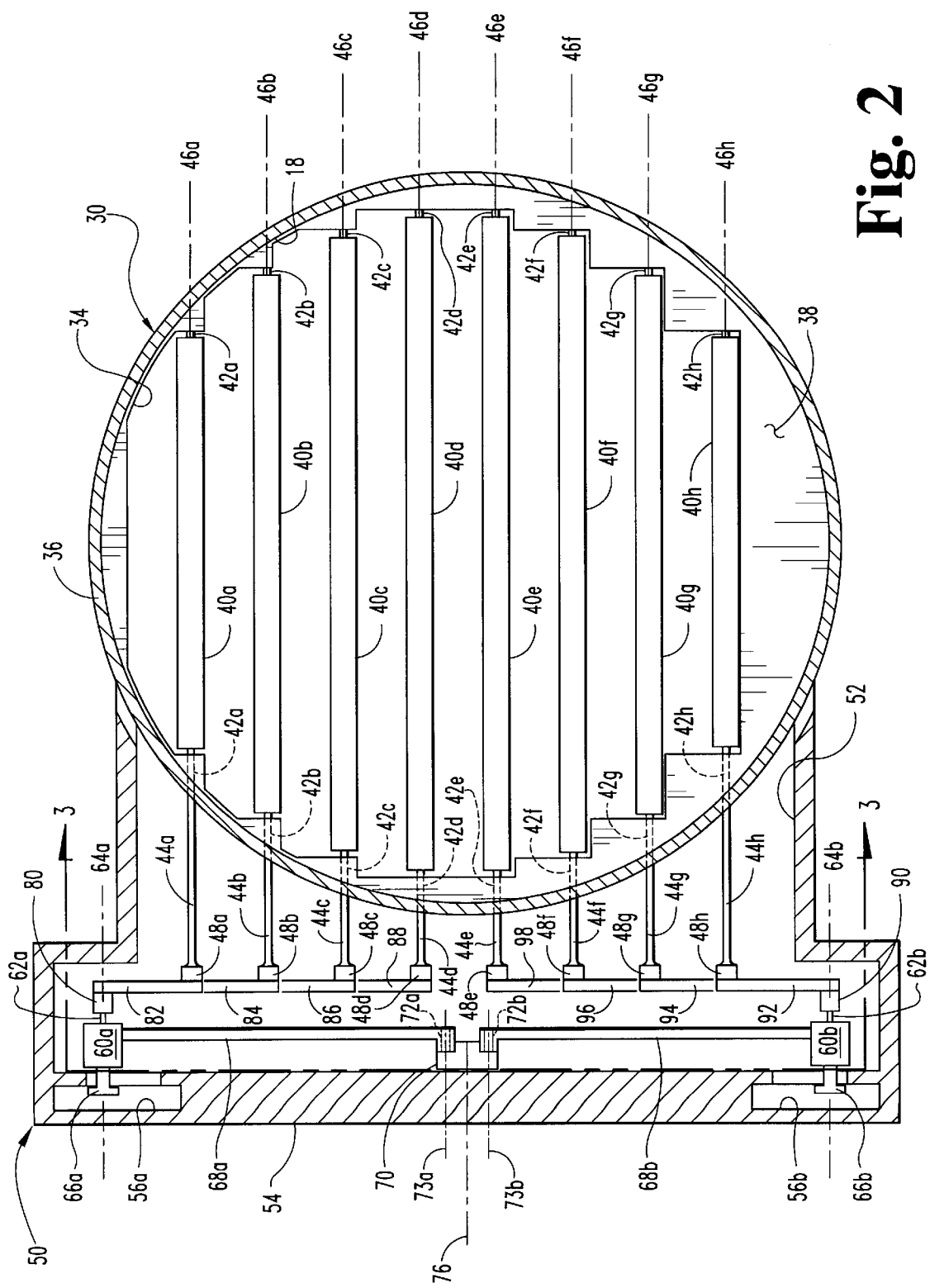
FIG. 2 is a partial, diagrammatic cross-sectional view of the embodiment shown in FIG. 1.

Thrust directing mechanism 30 receives working fluid flowing along arrow W in discharge passage 18 and discharges the working fluid through outlet 34. Referring additionally to FIGS. 2, further details of thrust directing mechanism 30 are depicted in a partial diagrammatic sectional view taken along section line 2—2 of FIG. 1. Thrust directing mechanism 30 includes a number of variable pitch vanes 40a, 40b, 40c, 40d, 40e, 40f, 40g, 40h (collectively designated vanes 40). The orientation of vanes 40 is controlled to direct the flow of working fluid as it exits outlet 34.

Vanes 40 preferably span across outlet 34 and are airfoil shaped in a manner configured to maximize thrust efficiency and thrust directing capability. Vanes 40 are each pivotally mounted to aircraft 10 by a corresponding mounting shaft 42a, 42b, 42c, 42d, 42e, 42f, 42g, 42h (collectively referred to as shafts 42). Each shaft 42 is journaled to aircraft 10 adjacent each opposing end of the corresponding vane 40. Preferably, an appropriate pair of journal bearings is used for each shaft. These bearings should provide smooth and reliable rotational positioning of each of vanes 40 about a corresponding rotational axis 46a, 46b, 46c, 46d, 46e, 46f, 46g, 46h (collectively referred to as rotational axes 46). Each shaft 42 has a control portion 44a, 44b, 44c, 44d, 44e, 44f, 44g, 44h (collectively referred to as control portions 44) extending through wall 36. Control portions 44 extend into housing 52 as part of control linkage 50 enclosed therein.

Figure 3:
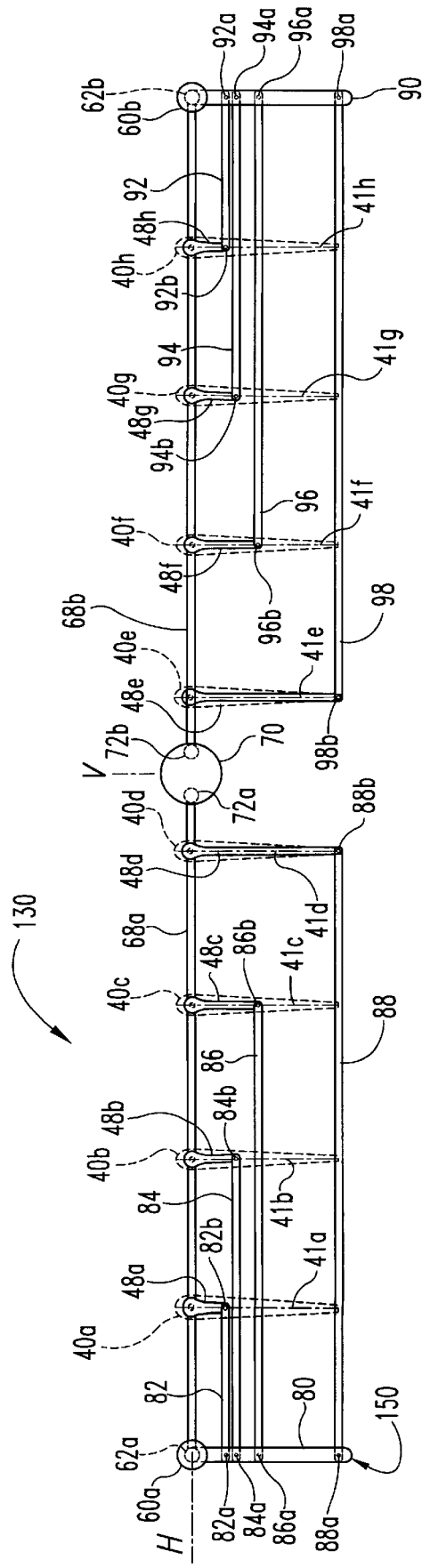
FIG. 3 is a diagrammatic side view of a portion of the embodiment shown in FIG. 2 illustrating the vanes in a first position in phantom.

Referring additionally to FIG. 3, as indicated by section line 3—3 of FIG. 2, each vane 40 has a corresponding chord line 41a, 41b, 41c, 41d, 41e, 41f, 41g, 41h (collectively referred to as chord lines 41) each illustrated as a dashed line segment. When chord lines 41 are generally parallel to vertical axis V, a neutral thrust vector results, which generally corresponds to vertical thrust parallel to arrow W. By pivoting vanes 40 by generally the same amount—such that the chords 41 remain generally parallel to each other—a non-neutral thrust vector results. FIG. 1 depicts working fluid directed from a path along arrow W to a path along arrow VM by vanes 40. Non-neutral thrust vector TV corresponds to the flow of working fluid along arrow VM. Preferably, vanes 40 have generally parallel rotational axes 46 and are evenly spaced apart from each other to form a cascaded guide vane bank. However, in alternative embodiments, the spacing and arrangements of vanes 40 may vary as would occur to one skilled in the art.

Vanes 40 are shown adjacent a mounting ring 38. Mounting ring 38 is contoured with a stair step pattern to assure a substantial portion of working fluid exiting outlet 34 passes between vanes 40. Preferably, vanes 40 may be pivoted so that the chord lines 41 are approximately parallel to the horizontal axis H (and approximately perpendicular to vertical axis V) to effectively close outlet 34 when not in use. It should be understood that outlet 34 and discharge passage 18 have a generally circular cross-section corresponding to the typical cross-section of a gas turbine engine. In other embodiments, a still different cross-sectional shape may be employed for the discharge passage or outlet.

FIG. 3 further illustrates control linkage 50 of thrust directing mechanism 30. Vanes 40 are represented in phantom in FIG. 3 because of the intervening portion of wall 36. Control linkage 50 includes control portions 44 of shaft 42 and crank arms 48a, 48b, 48c, 48d, 48e, 48f, 48g, 48h (collectively referred to as crank arms 48). Each crank arm 48 is rigidly attached to a corresponding control portion 44 at approximately a right angle.

Housing 52 has a wall 54 defining opposing slots 56a, 56b. Corresponding to slots 56a, 56b are actuators 60a, 60b engaged therein. Housing 52 is positioned to one side of passage 18. Preferably, housing 52 is counter-balanced by various aircraft components on the opposing side of passage 18. Each actuator 60a, 60b has a corresponding shaft 62a, 62b which is selectively rotated by activation of actuator 60a, 60b, respectively. Shaft 62a rotates about axis 64a, and shaft 62b rotates about axis 64b. Opposite each shaft 62a, 62b is a captive actuator lug 66a, 66b. Each captive actuator lug 66a, 66b slidingly engages slot 56a, 56b to permit selective positioning of actuator 60a, 60b therealong. Captive actuator lug 66a, 66b retains actuator 60a, 60b in a predetermined relationship to wall 54 regardless of position along corresponding slot 56a, 56b, respectively.

Each actuator 60a, 60b has transverse control rod 68a, 68b each connected to central actuator 70. Central actuator 70 is connected to transverse control rod 68a by pivot pin coupling 72a. Opposite pivot pin coupling 72a, is pivot pin coupling 72b which connects transverse control rod 68b to central actuator 70. Pivot pin couplings 72a, 72b have pivot axes 73a, 73b. Central actuator 70 is configured for selective rotation about axis 76. Preferably axis 76 is positioned about midway between the pivot axes 73a, 73b.

Control link 80 is rigidly connected to shaft 62a so that it pivots about axis 64a when actuator 60a is activated. Control link 80 is pivotally coupled to each vane 40a, 40b, 40c, 40d by tie rod 82, 84, 86, 88, respectively. Each tie rod 82, 84, 86, 88 is pivotally attached to control link 80 by pivot pin 82a, 84a, 86a, 88a. Each tie rod 82, 84, 86, 88 is pivotally attached to crank arm 48a, 48b, 48c, 48d by corresponding pivot pin 82b, 84b, 86b, 88b. Generally, pivot pins 82a, 84a, 86a, 88a lie along the length of rods 82, 84, 86, 88 opposite pivot pins 82b, 84b, 86b, 88b, respectively. Each of the tie rods 82, 84, 86, 88 has a different length corresponding to the spacing of control link 80 from each of vanes 40a, 40b, 40c, 40d, and the relative spacing between each of the vanes 40a, 40b, 40c, 40d with respect to each other. For the embodiment depicted, the length of rod 88>length of rod 86>length of rod 84>length of rod 82.

Likewise control link 90 is rigidly connected to shaft 62b so that is pivots about axis 64b when actuator 60b is activated. Control link 90 is pivotally coupled to each vane 40h, 40g, 40f, 40e by tie rod 92, 94, 96, 98, respectively. Each tie rod 92, 94, 96, 98 is pivotally attached to control link 90 by corresponding pivot pins 92a, 94a, 96a, 98a. Each tie rod 92, 94, 96, 98 is also pivotally attached to crank arm 48h, 48g, 48f, 48e by pivot pins 92b, 94b, 96b, 98b, respectively. Notably, each of the tie rods 92, 94, 96, 98 has a different length corresponding to the spacing of control link 90 from each of vanes 40h, 40g, 40f, 40e and the relative spacing between each of the vanes 40h, 40g, 40f, 40e with respect to each other. Specifically, the length of rod 98>length of rod 96>length of rod 94>length of rod 92.

Aircraft 10, thrust directing mechanism 30, central linkage 50, and housing 52 are made from conventional materials know to those skilled in the art. In one embodiment, these structures are predominately manufactured from metal. In other embodiments, selected composite materials may be preferred. When lift engine 20 is of the type discharging working fluid at an elevated temperature, it should be recognized that structure exposed to the hot discharge stream such as wall 36, mounting ring 38, vanes 40, shafts 42, and shaft bearings, will need to be constructed from materials appropriate for such elevated temperatures. In one embodiment, an appropriate combination of ceramic and metallic materials is preferred.

One mode of operating mechanism 30 is next discussed in connection with FIGS. 1–5, it being understood that other modes of operation are also contemplated as would occur to one skilled in the art. The "neutral vector" position of thrust directing mechanism 30 is generally depicted in FIGS. 2 and 3. This neutral vector generally corresponds to a vertical thrust vector parallel to axis V, which is typically desired at some point during vertical/short take off and vertical landing operations.

The vane orientation shown in FIGS. 1 and 4 corresponds to an intermediate thrust vector TV depicted by FIG. 1. Thrust vector TV includes substantial vertical and horizontal directional components along axes H and V, respectively. Frequently, this type of intermediate thrust vector TV is selected for transition from a take-off or landing mode to a cruise mode. In the cruise mode, aircraft 10 travels predominately along H axis and is preferably propelled by another thrust source (not shown).

Thrust vector TV is obtained by tilting or pivoting each of vanes 40 by about the same amount. From the perspective of FIG. 4, this orientation is accomplished by activating actuator 60a, 60b to rotate shaft 62a, 62b counter clockwise and to correspondingly turn control link 80, 90 about axis 64a, 64b.

With rotation of control link 80, each rod 82, 84, 86, 88 pivots about corresponding pivot pin 82a, 84a, 86a, 88a and pushes against corresponding crank arm 48a, 48b, 48c, 48d. In response to this pushing force, rods 82, 84, 86, 88 correspondingly rotate about pivot pins 82b, 84b, 86b, 88b, and turn crank arms 48a, 48b, 48c, 48d to pivot vanes 40a, 40b, 40c, 40d about axes 46a, 46b, 46c, 46d, respectively.

For rotation of control link 90, each rod 92, 94, 96, 98 pivots about corresponding pivot pin 92a, 94a, 96a, 98a and pulls on corresponding crank arm 48h, 48g, 48f, 48e. In response to this pulling force, rods 92, 94, 96, 98 correspondingly pivot about pivot pins 92b, 94b, 96b, 98b to turn crank arms 48h, 48g, 48f, 48e and pivot vanes 40h, 40g, 40f, 40e about axes 46h, 46g, 46f, 46e, respectively.

In this manner, selective rotation of control links 80, 90 with actuators 60a, 60b, respectively, provide vectoring of vanes 40 by a tandem rotation of each of vanes 40 by about the same amount. For example, by rotating each control link 80, 90 clockwise past the straight neutral vector (opposite the direction rotated as shown in FIGS. 1 and 4), a vector with a horizontal directional component opposing the horizontal component of thrust vector TV may be obtained. Furthermore, by rotating control links 80, 90 toward each other (rotating control link 80 counter clockwise and control link 90 clockwise), a convergent pattern may be provided about axis V. Similarly, by rotating control links 80, 90 away from each other (rotating control link 80 clockwise and control link 90 counter clockwise), a divergent pattern may be obtained with respect to axis V. By controlling the convergent/divergent pattern of vanes 40, discharge throat area presented to the working fluid may be controlled.

FIG. 5 illustrates one preferred method to converge the vanes to control throat area. The vane pattern of FIG. 5 has the outermost vanes (40a, 40h) with the greatest pivot angle in relation to axis V and the innermost vanes (40d, 40e) with the smallest pivot angle relevant to axis V. The remaining vanes 40b, 40c, 40f, 40g have a pivot angle between these extremes. This angular difference from vane to vane generally provides more efficient nozzle performance compared to systems which can only adjust throat area by turning the vanes the same amount.

The multiple angle convergent pattern is obtained by rotating central actuator 70 about axis 76 (approximately 90 degrees for the embodiment depicted in FIG. 5). In response, transverse control rods 68a, 68b move closer to each other, pivoting about pivot axes 74a, 74b. Also, repositioning of transverse control rods 68a, 68b by activation of central actuator 70 pulls actuators 60a, 60b closer together, sliding them along slots 56a, 56b, respectively. By controlling the amount of rotation of central actuator 70, the degree of convergence can also be controlled. The control links 80, 90 may maintain a generally parallel orientation to axis V when a neutral vector with an adjusted throat area is desired.

With actuator 60a, 60b approaching each other, rods 82, 84, 86, 88 push on crank arms 48a, 48b, 48c, 48d and correspondingly rotate about pivot pins 82b, 84b, 86b, 88b. Accordingly, vanes 40a, 40b, 40c, 40d rotate to different pivot angles. The pivot angle of each of vanes 40a, 40b, 40c, 40d is a function of the distance between the pivot point for each of pivot pins 82b, 84b, 86b, 88b and rotational axes 46a, 46b, 46c, 46d. The pivot angle A is shown for vane 40a relative to chord line 41a and an axis parallel to axis V which perpendicularly intersects axis 46a. The pivot angle for the remaining vanes 40 would be similarly obtained with respect to axis V. The shorter the distance between the pivot pin 82b, 84b, 86b, 88b and the rotational axis 46a, 46b, 46c, 46d, the greater the angular sweep of the corresponding vane 40a, 40b, 40c, 40d in response to translational movement of actuator 60a and control link 80 toward actuator 60b and control link 90 along horizontal axis H.

Due to the symmetry of control linkage 50 about axis V, translational motion of actuator 60b and crank link 90 as determined by actuation of central actuator 70, results in vanes 40h, 40g, 40f, 40e having an approximate "mirror image" angular position relative to vanes 40a, 40b, 40c, 40d.

Notably, the convergent pattern may be obtained by rotating central actuator 70 in either a clockwise or counter clockwise direction by the same amount from a neutral position corresponding to that shown in FIGS. 3 and 4. Also, various combinations of vectoring and desired throat area may be obtained by selectively rotating control links 80, 90 in conjunction with activation of central actuator 70. Thus, thrust directing system 30 generally provides a way to control thrust vectoring and nozzle throat area with vanes 40 by selectively positioning control links 80, 90.

In another embodiment, control linkage 50 may be reconfigured to provide a divergent pattern as well as a convergent pattern by adjusting the tie rods to provide a divergent pattern when control actuator 70 is in the neutral position of FIGS. 3 and 4. As central actuator 70 of such a modified linkage is rotated from this neutral position by a first amount it will correspondingly rotate vanes 40 to a neutral vector position. By rotating central actuators 70 with this modified linkage a second amount greater than the first amount it will reconfigure vanes 40 into a convergent position.

FIG. 6A depicts thrust mechanism 330 of a second embodiment of the present invention in a partial cross-sectional view. Like FIG. 2, the view plane of FIG. 6A corresponds to a cross-sectional plane through discharge passage 318 which is generally perpendicular to the direction of working fluid flowing therethrough. Discharge passage 318 has corresponding discharge outlet 334 and four walls 336a, 336b, 336c, 336d (collectively designated walls 336) oriented to present a generally rectangular cross-sectional shape of passage 318 and outlet 334. Vanes 340 are generally evenly spaced apart from one another across outlet 334 along longitudinal axis L of outlet 334.

Each vane 340 has a corresponding mounting shaft 342 with pivot axis 346. Each pivot axis 346 is generally perpendicular to axis L. Each shaft 342 passes through wall 366a and has a corresponding control portion 344. Journaling of shafts 342 to opposing walls 336a and 336c is comparable to journaling of shafts 42 to aircraft 10 in FIG. 2. Each control portion 344 interfaces to a control linkage configured similar to control linkage 50 illustrated in FIG. 2. However, unlike the embodiment of FIG. 2, vanes 340 each have about the same length and shape in the embodiment of FIG. 6A. Also, mechanism 330 does not preferably include structure comparable to mounting ring 38 of FIG. 2. Discharge passage 318 may be provided by transitioning from the generally circular cross-sectional shape common to the exit of many gas turbine engines and lift fans to the rectilinear shape presented. Alternatively, the rectangular shape of passage 318 may be included as part of a separable nozzle device that has a transitional portion (not shown) configured to mate with working fluid passages of various cross-sectional shapes.

Figure 6B:
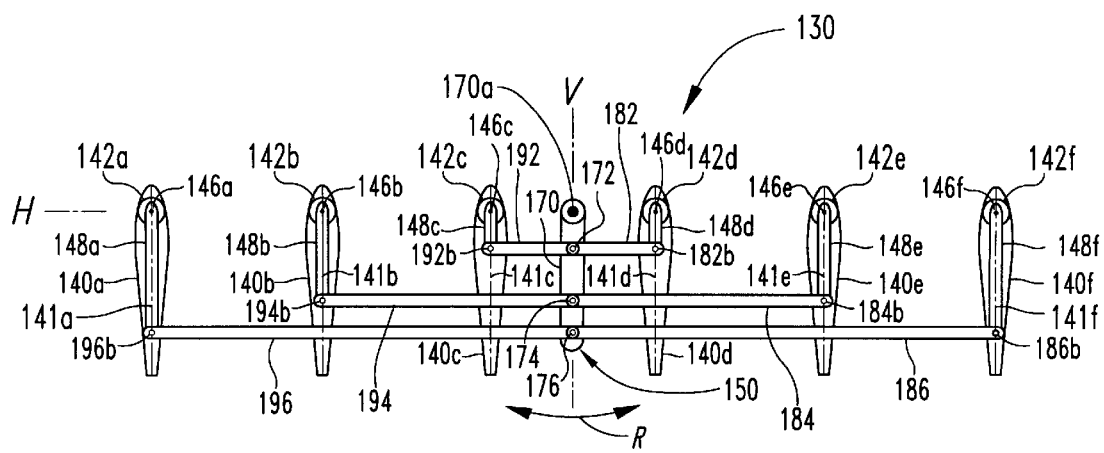
FIG. 6B is a diagrammatic side view of a third embodiment of the present invention including guide vanes illustrated in a first position.
Figure 7:
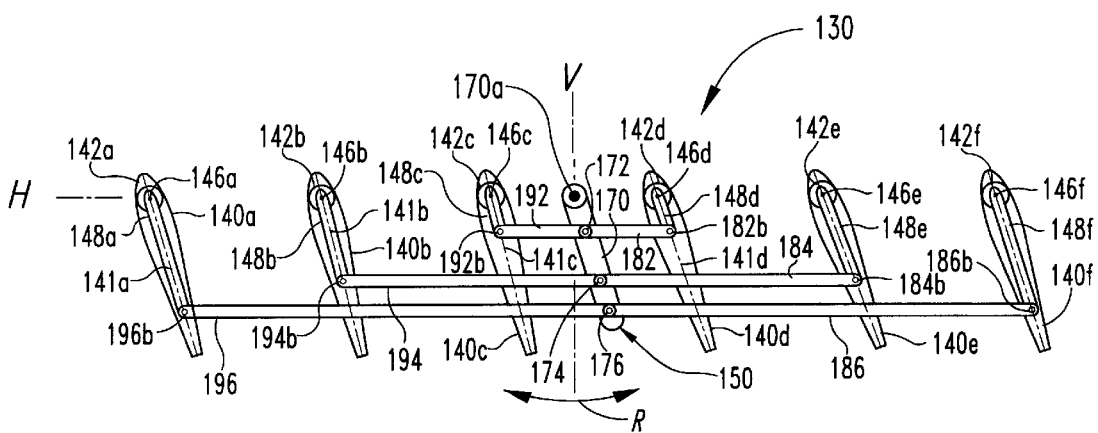
FIG. 7 is a diagrammatic side view of the embodiment shown in FIG. 6B with the vanes shown in a second position.
Figure 8:
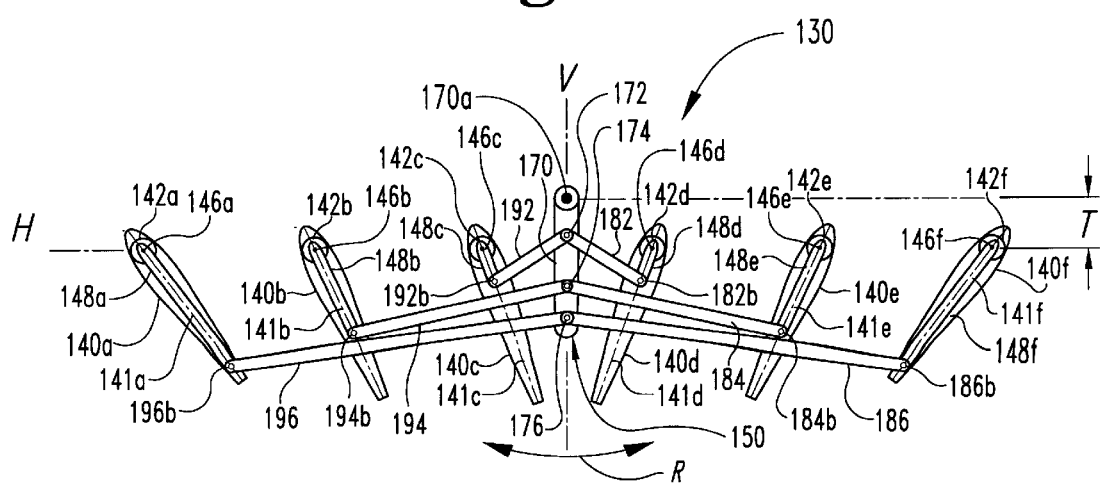
FIG. 8 is a diagrammatic side view of the embodiment shown in FIG. 6B with the vanes shown in a third position.

FIGS. 6B, 7, and 8 depict a diagrammatic side view of a third embodiment of the present invention, as thrust directing mechanism 130. Thrust directing mechanism 130 includes vanes 140a, 140b, 140c, 140d, 140e, 140f (collectively designated vanes 140). Vanes 140 are shown with a generally airfoil shaped cross section preferably configured to maximize thrust directing efficiency. The flow of working fluid is generally parallel to axis V. Furthermore, it should be noted that thrust directing mechanism 130, as presented in FIGS. 6B, 7, and 8, is generally symmetric about a plane perpendicular to the plane of view and containing axis V.

Vanes 140 have corresponding chord lines 141a, 141b, 141c, 141d, 141e, 141f (collectively designated chord lines 141) illustrated as a dashed line segment. Vanes 140 are preferably positioned span wise across a working fluid discharge pathway to direct fluid flow as it is discharged. Furthermore, vanes 140 are preferably configured in a cascade arrangement.

Vanes 140 are each pivotally mounted by a corresponding shaft 142a, 142b, 142c, 142d, 142e, 142f (collectively designated shafts 142) so that they rotate about axes 146a, 146b, 146c, 146d, 146e, 146f (collectively designated axes 146), respectively. Axes 146 are perpendicular to the view plane of FIGS. 6B, 7, and 8; and are thus shown as pivot points. Vanes 140 each have a rigidly connected crank arm 148a, 148b, 148c, 148d, 148e, 148f (collectively designated crank arms 148) which interface with control linkage 150.

Control linkage 150 includes a control link 170 configured for selective positioning. Control link 170 has a pivot pin 172 pivotally connecting tie rod 182 to control link 170 and tie rod 192 to control link 170. Generally, tie rod 182 opposes tie rod 192. Pivot pin 182b rotatably attaches tie rod 182 to crank arm 148d; thus pivotally coupling control link 170 and vane 140d. Likewise, pivot pin 192b couples rod 192 to crank arm 148c.

Pivot pins 174, 176 pivotally connect opposing tie rods 184, 194 and 186, 196, respectively, to control link 170. Pivot pins 184b, 194b, rotatably attach rods 184, 194 to crank arms 148e, 148b, respectively. Pivot pins 186b, 196b rotatably attach rods 186, 196 to crank arms 148f, 148a, respectively.

Preferably, control link 170 is configured for selective movement by one or more actuators using techniques known to those skilled in the art. Control link 170 is configured to move with at least two degrees of freedom. One degree of freedom of motion corresponds to translational motion of control link 170 along axis V. Another degree of freedom of motion corresponds to rotational motion of control link 170 about pivot point 170a and along path R.

Vanes 140 of FIG. 6B are illustrated in approximately non-convergent neutral vector positions. FIG. 7 shows a non-neutral thrust vector position of vanes 140 obtained by rotating control link 170 counterclockwise about pivot point 170a. In this position, each of vanes 140 has about the same pivot angle with respect to axis V; where the pivot angle is determined between chord line 141 and a line parallel to axis V for each of vanes 140, respectively. Vanes 140 are turned the same amount for a desired thrust vector in accordance with rotational position of control link 170 about pivot point 170a.

FIG. 8 illustrates a convergent orientation of vanes 140 obtained by moving control link 170 along axis V a distance T. The convergent pattern of vanes 140 have varying pivot angles similar to the pattern obtained by thrust directing mechanism 30 in FIG. 5 of the previously discussed embodiment. This pattern is adjusted in a similar manner by the pivotally linked rods 82, 84, 86, 92, 94, 96. The convergent pattern of FIG. 8 provides generally better thrust efficiency than a convergent pattern with uniform pivot angles. In further resemblance to the embodiment of FIG. 5, the pivot angles vary as a function of the distance between the pivotal connections at pins 182b, 192b, 184b, 194b, 186b, 196b and the corresponding rotational axes 146. Notably, in other embodiments, control link 170 and rods 182, 184, 186, 192, 194, 196 may be reconfigured to provide a selectable divergent pattern as an alternative or in addition to the convergent pattern illustrated in FIG. 8.

Referring generally to the embodiments of FIGS. 1–8, a few features of the present invention are further discussed. Control links 80, 90, 170 are each configured to move with two degrees of freedom. A two coordinate position generally corresponds to the two degrees of freedom of each control link. For the embodiments illustrated, a thrust vector generally corresponds to a given position of the control link along a rotational path—a first positional coordinate; and convergence (or divergence) generally corresponds to position of the control link along a translational path—the second positional coordinate. Each control link is pivotally coupled to several guide vanes by corresponding linkage. Generally, a desired thrust vector and convergent pattern may be mapped as a function of these two coordinates. Notably, a given control link may have a limited range for either or both of the coordinates. For alternative embodiments offering a divergent orientation either as an alternate or an addition to a convergent orientation, a similar two coordinate mapping may be used to activate one or more appropriate actuators to position corresponding control links and rotate pivotally coupled vanes to a desired orientation.

In other embodiments, various types, shapes, and quantities of control links may be used as occurred to one skilled in the art. These alternative control links may include utilization of two different paths or degrees of freedom of motion. Furthermore, the general correspondence of a desired thrust vector to one positional coordinate and convergence (or divergence) to another positional coordinate may not be utilized in some alternative embodiments.

Also, a different type of linkage arm besides tie rods 82, 84, 86, 88, 92, 94, 96, 98, 182, 184, 186, 192, 194, 196 may be used as would occur to one skilled in the art. Furthermore, it should be appreciated that the linkage may be reconfigured to accommodate special arrangements concerning housing of the thrust directing mechanism. Furthermore, more or less linkage components between the vanes and control link(s) may be used. Also, it should be noted that the thrust directing mechanism of the present invention avoids placement of the control linkage in the discharge passage. This advantage is particularly relevant when a hot gas working fluid is utilized because it permits greater freedom in choosing linkage materials.

Figure 9:
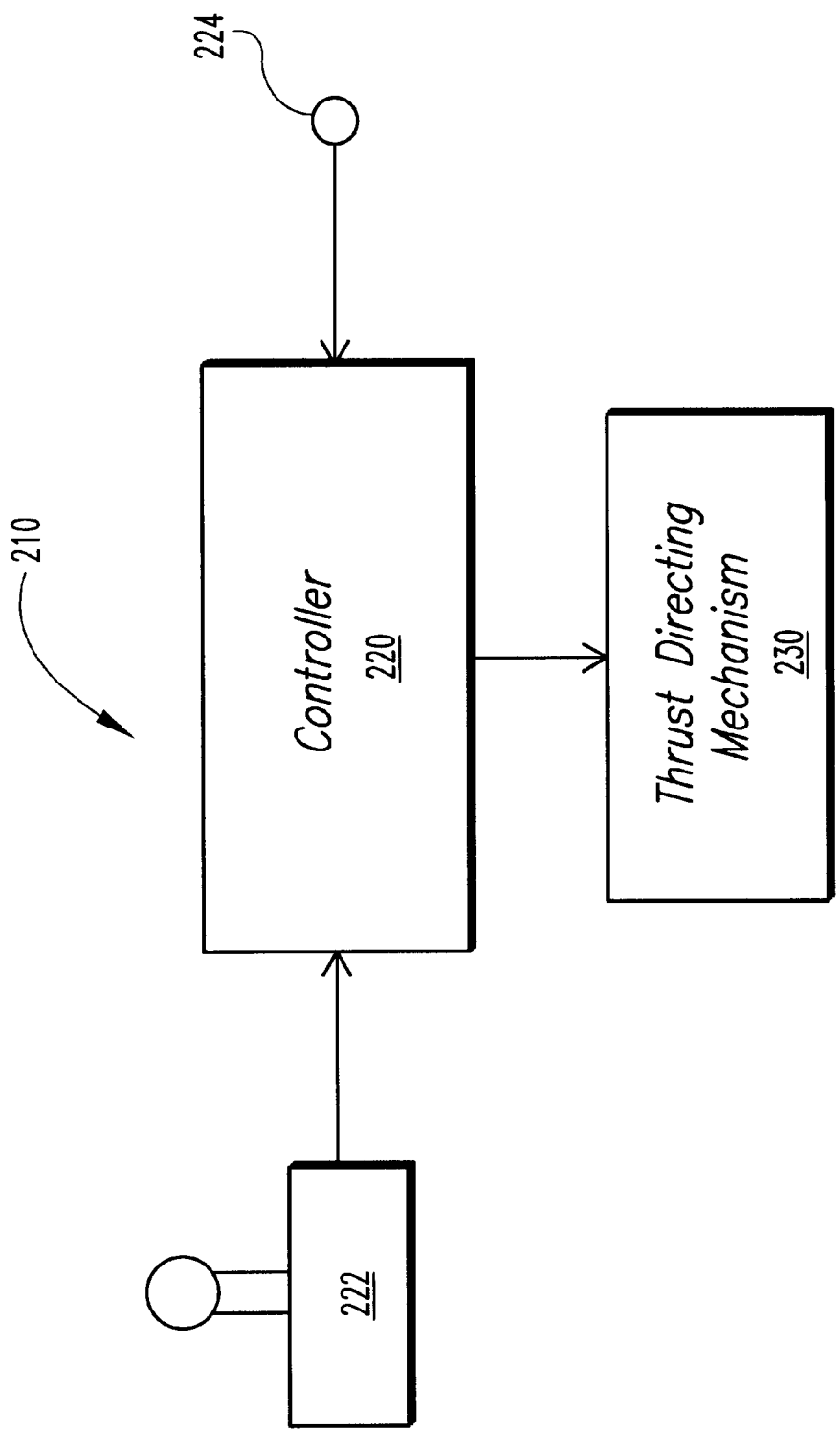
FIG. 9 is a schematic illustration of a control system of the present invention.

In one alternative embodiment, the thrust directing mechanism is provided as part of a separable, external nozzle which is coupled to an aircraft. The present invention may also be combined with various other thrust vectoring systems known to those skilled in the art. Also, more or less vanes than those of the illustrated embodiments may be employed. Referring to FIG. 9, an embodiment of an airborne thrust control system 210 for an aircraft is shown for use with a thrust directing mechanism 230 of the present invention. Thrust directing mechanism 230 may be substantially the same as thrust directing mechanism 30 or 130, a combination thereof, or a modified version within the spirit of the present invention. Thrust directing mechanism 230 includes an actuation system responsive to signals from controller 220. This actuation system includes one or more actuators which may be hydraulic, pneumatic, electromagnetic, or such other type of actuation system as would occur to one skilled in the art. The actuation system is used to selectively position one or more control links of thrust directing mechanism 230 having at least two degrees of freedom. The one or more control links are pivotally coupled to variable pitch vanes of thrust directing mechanism 230 to control thrust vectoring and throat area as a function of a two coordinate position corresponding to the minimum two degrees of freedom of motion.

Controller 220 is also operatively coupled to a pilot control stick 222 and sensors 224. Controller 220 is configured to respond to one or more steering signals from control stick 222 corresponding to a desired directional heading of an aircraft. Also, controller 220 is configured to monitor aircraft position from aircraft sensors 224. These sensors provide position signals corresponding to current and desired aircraft position necessary for continued, stable operation of the aircraft. For example, position signals may correspond to the degree to which the aircraft is level, such as pitch and roll positions of the aircraft. Generally, the steering signals and the position signals may include without limitation, information relating to aircraft speed, acceleration, weight, balance, threat avoidance, and positional information relating to the six possible degrees to freedom of motion common to an aircraft.

Controller 220 is configured to determine a desired orientation of the vanes of thrust directing mechanism 230 from a thrust control signal. This desired orientation may include a given thrust vector, degree of convergence or divergence, or a combination of both. The thrust control signal may be a function of one or more steering signals, position signals, or a combination of both. The desired vane orientation is determined as a function of the thrust control signal and the two coordinate position of the one or more control links of thrust directing mechanism 230. The controller provides an actuation signal in accordance with the desired orientation to actuate the actuation system of thrust directing mechanism 230. The actuation system responds to the actuation signal to correspondingly pivot the vanes to the desired orientation.

Controller 220 may be a single unit, or a collection of operatively coupled units on board the aircraft. Also, controller 220 may be an electronic circuit comprised of one or more components. Similarly, controller 220 may be comprised of digital circuitry, analog circuitry, or both. Also, controller 220 may be programmable, an integrated state machine, or a hybrid combination thereof.

Sensors 224 may provide a signal in either a digital or analog format compatible with associated equipment.

Correspondingly, equipment coupled to sensors 224 is configured to condition and convert sensor signals to the appropriate format, as required. All sensors 224 are of type known to those skilled in the art.

All publications, patents, and patent applications cited in this specification are herein incorporated by reference as if each individual publication, patent, or patent application were specifically and individually indicated to be incorporated by reference.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A thrust system, comprising:
   (a) an aircraft having a passage with an outlet configured to discharge working fluid to produce thrust;
   (b) a number of vanes pivotally mounted across said outlet to direct thrust, said number of vanes including at least a first vane, a second vane mounted adjacent said first vane, and a third vane mounted adjacent said second vane;
   (c) a thrust control linkage including a control link, said link being spaced apart from said first, second, and third vanes, said linkage further including:
      a first tie rod pivotally coupling said first vane to said link, said first tie rod having a first length corresponding to a first distance between said link and said first vane,
      a second tie rod pivotally coupling said second vane to said link, said second tie rod having a second length greater than said first length, said second length corresponding to a second distance between said link and said second vane,
      a third tie rod pivotally coupling said third vane to said link, said third tie rod having a third length greater than said second length, said third length corresponding to a third distance between said link and said third vane; and
   wherein said link is configured for actuator controlled movement to pivot each of said vanes.

2. The system of claim 1, wherein said first vane is journaled to said aircraft with a mounting shaft extending through a wall of said passage, said shaft is rigidly connected to a crank arm, and said crank arm is pivotally connected to said first tie rod to pivotally couple said first tie rod to said first vane.

3. The system of claim 1, wherein said link is configured for controlled movement with two degrees of freedom and has a corresponding two coordinate position.

4. The system of claim 3, wherein said two coordinate position has a first coordinate corresponding to rotational position of said link about a first axis and a second coordinate corresponding to position of said link along a second axis.

5. The system of claim 1, wherein said link is configured for selective positioning along a first path to vector thrust with said vanes and said link is configured for selective positioning along a second path to adjust convergence of said vanes.

6. The system of claim 1, wherein:
   said first vane is configured to pivot about a first axis and said second vane is configured to pivot about a second axis;
   said first tie rod is coupled to said first vane a first distance from said first axis and said second tie rod is coupled to said second vane a second distance from said second axis, said first distance differing from said second distance by a selected amount; and
   said link is configured to move along a path to controllably pivot each of said vanes relative to a reference axis, said link having a position to correspondingly position said first vane at a first pivot angle and said second vane at a second pivot angle, and said first pivot angle is greater than said second pivot angle as a function of said selected amount.

7. The system of claim 1, wherein said vanes are cascaded, being generally parallel to each other and approximately equally spaced apart, and said outlet has a generally rectangular shape.

8. A thrust control method, comprising:
   (a) discharging working fluid through a passage of an aircraft to provide thrust;
   (b) pivotally mounting a first number of vanes across the passage to direct thrust relative to a reference axis, the first vanes each having a corresponding linkage arm pivotally connected thereto;
   (c) pivotally coupling the corresponding linkage arm of each of the first vanes to a first control link;
   (d) moving the first control link along a first path to vector thrust relative to the reference axis; and
   (e) moving the first control link along a second path to control convergence of the first vanes.

9. The method of claim 8, further comprising:
   (f) pivotally mounting a second number of vanes across the passage to direct thrust relative to the reference axis;
   (g) pivotally coupling each of the second vanes to a second control link; and
   (h) moving the the second control link closer to said first control link to adjust convergence of the first vanes and second vanes.

10. The method of claim 9, further comprising rotating the second control link to vector thrust with the second vanes.

11. The method of claim 9, further comprising pivotally connecting the first and second control links to an actuator, the actuator being configured to control distance between the first and second control links and correspondingly adjust convergence of the first and second vanes about the reference axis.

12. The method of claim 8, wherein the first path corresponds to a rotational degree of freedom of movement of the first control link and the second path corresponds to a translational degree of freedom of movement of the first control link.

13. The method of claim 8, wherein the first control link is connected to an actuator, and the actuator is configured to rotate the first control link about a rotational axis to vector thrust with the first vanes.

14. The method of claim 8, wherein the first path corresponds to rotation about a first axis and the second path corresponds to translation along a second axis, and the first axis is generally perpendicular to the second axis.

15. The method of claim 14, wherein the reference axis is generally perpendicular to the first and second axes.

16. A thrust system, comprising:
   an aircraft having a passage with an outlet configured to discharge working fluid to produce thrust;
   a number of vanes pivotally mounted across said outlet to direct flow of fluid discharged through said outlet relative to a reference axis, said number of vanes being at least three and including a first vane configured to pivot about a first axis, and a second vane configured to pivot about a second axis;

a number of arms each being pivotally coupled to a corresponding one of said number of vanes, said number of arms being at least three and including a first arm pivotally connected to said first vane at a first distance from said first axis, and a second arm pivotally connected to said second vane at a second distance from said second axis, the first distance differing from the second distance by a selected amount;

an actuator controlled link pivotally coupled to each of said number of arms, said control link being configured to move along a path to controllably pivot each of said vanes in relation to said reference axis, said control link having a first position to correspondingly pivot said first vane to a first pivot angle and said second vane to a second pivot angle, said first pivot angle being greater than said second pivot angle as a function of said selected amount.

17. The system of claim 16, wherein said control link has a second position to correspondingly pivot said first and second vanes to an approximately parallel position relative to said reference axis.

18. The system of claim 16, wherein each of said vanes is journaled to said aircraft by a corresponding one of a number of mounting shafts extending through a wall of said passage, and each of said shafts is rigidly connected to a corresponding one of a number of crank arms, and each of said crank arms is pivotally connected to one of said arms.

19. The system of claim 16, wherein said first arm has a first length and said second arm has a second length greater than said first length, and said outlet has a generally rectangular shape.

20. The system of claim 16, wherein said control link is configured for controlled movement with two degrees of freedom and has a corresponding two coordinate position, and said vanes are configured to pivot in response to movement of said control link.

21. The system of claim 20, wherein said two coordinate position has a first coordinate corresponding to rotational position of said control link about a rotational axis and a second coordinate corresponding to position of said control link along a translational axis.

22. The system of claim 16, wherein said control link is configured for selective positioning along a first path to vector thrust with said vanes and said control link is configured for selective positioning along a second path to adjust convergence of said vanes.

23. A thrust control method, comprising:
(a) discharging working fluid through a passage of an aircraft to provide thrust,
(b) pivotally mounting at least three vanes across the passage to direct working fluid flow;
(c) coupling each of the vanes to a control link selectively moveable to correspondingly pivot the vanes, the control link being configured to move with two degrees of freedom and having a corresponding two coordinate position;
(d) determining a first desired orientation of the vanes as a function of the two coordinate position of the control link; and
(e) moving the control link to correspondingly pivot the vanes to the first desired orientation.

24. The method of claim 23, wherein the two coordinate position has a first coordinate corresponding to rotational position of the control link about a first axis and a second coordinate corresponding to translational position of the control link along a second axis.

25. The method of claim 23 wherein said determining includes:
(d1) establishing a desired thrust vector; and
(d2) establishing a desired degree of convergence of the vanes.

26. The method of claim 23, further comprising:
(f) determining a second desired orientation of the vanes as a function of the two coordinate position; and
(g) moving the control link to correspondingly pivot the vanes from the first desired orientation to the second desired orientation.

27. The method of claim 23, wherein rotation of the control link about a first axis corresponds to a first degree of freedom and movement of the control link along a second axis corresponds to a second degree of freedom.

28. The method of claim 23, wherein said moving includes:
(e1) rotating the control link about a first axis to vector thrust; and
(e2) positioning the control link along a second axis to establish a convergent pattern of the vanes.

29. The method of claim 23, further comprising:
(f) rotating the control link to vector thrust without converging the vanes; and
(g) translationally moving the control link to converge the vanes without vectoring thrust.

30. A thrust-propelled apparatus, comprising:
a first control link;
a plurality of vanes configured to pivot about a corresponding rotational axis relative to a reference axis to direct flow of a working fluid being discharged to produce thrust, said first vanes numbering at least three;
a first rod pivotally coupled to a first one of said vanes and pivotally coupled to said first control link, said first rod spanning a first distance between said first one of said vanes and said first control link;
a second rod pivotally coupled to a second one of said vanes and pivotally coupled to said first control link, said second rod spanning a second distance between said second one of said vanes and said first control link, said second distance being greater than said first distance; and
a third rod pivotally coupled to a third one of said vanes and pivotally coupled to said first control link, said third rod spanning a third distance between said third one of said vanes and said first control link, said third distance being greater than said second distance;
wherein said first control link is configured for selective positioning along a first path to vector thrust with said first vanes relative to said reference axis, and said first control link is configured for selective positioning along a second path to adjust convergence of said first vanes.

31. The apparatus of claim 30, further comprising an aircraft with a lift engine providing the working fluid through a passageway, said passageway defining an outlet having a generally rectangular shape, and said vanes being position across said outlet.

32. The apparatus of claim 30, further comprising:
an aircraft having a passage with an outlet configured to discharge working fluid to produce thrust, said vanes being mounted across said outlet;

an actuator configured to position said first control link with two degrees of freedom, said first control link having a corresponding two coordinate position, said vanes being configured to pivot in response to movement of said first control link by said actuator; and a controller operatively coupled to said actuator, said controller being responsive to a thrust control signal corresponding to a desired pivotal orientation of each of said vanes, said controller being configured to provide an actuation signal corresponding to said thrust control signal as a function of said two coordinate position of said control link;

wherein said actuator responds to said actuation signal to position said control link and correspondingly pivot each of said vanes to said desired pivotal orientation.

33. The system of claim 32, wherein said two coordinate position has a first coordinate corresponding to rotational position of said first control link about a first axis and a second coordinate corresponding to translational position of said first control link along a second axis.

34. The system of claim 32, further comprising:

an operator controlled device configured to provide a steering signal corresponding to a desired direction of travel of said aircraft;

a sensor configured to provide a position signal corresponding to a corrective vector to maintain stability of said aircraft; and wherein said thrust control signal is determined in accordance with said steering signal and said position signal.

35. The system of claim 32, wherein:

said controller includes a first signal corresponding to rotational position of said first control link about a pivot point and a second signal corresponding to position of said pivot point relative to said corresponding rotational axis of each of said vanes; and said desired pivotal orientation is determined as a function of said first and second signals.

36. The apparatus of claim 30, wherein said first path corresponds to a rotational degree of freedom and said second path corresponds to a translational degree of freedom.

37. The apparatus of claim 30, wherein:

said first one of said vanes has a first shaft rigidly connected to a first crank arm, said first crank arm being rotatably connected to said first rod a first separation distance from said first shaft;

said second one of said vanes has a second shaft rigidly connected to a second crank arm, said second crank arm being rotatably connected to said second rod a second separation distance from said second shaft, said second separation distance being greater than said first separation distance; and said third one of said vanes has a third shaft rigidly connected to a third crank arm, said third crank arm being rotatably connected to said third rod a third separation distance from said shaft, said third separation distance being greater than said second separation distance.

38. The apparatus of claim 30, wherein said vanes are configured for selective orientation in a convergent pattern relative to said reference axis with said first one of said vanes having a first pivot angle, said second one of said vanes having a second pivot angle less than said first pivot angle, and said third one of said vanes having a third pivot angle less than said second pivot angle.

39. The apparatus of claim 30, wherein said vanes number at least six and further comprising:

a fourth rod pivotally coupled to a fourth one of said vanes and pivotally coupled to said first control link;

a fifth rod pivotally coupled to a fifth one of said vanes and pivotally coupled to said first control link;

a sixth rod pivotally coupled to a sixth one of said vanes and pivotally coupled to said first control link.

40. The apparatus of claim 39, wherein said first control link is posistioned between said third vane and said fourth vane.

41. The apparatus of claim 30, wherein said vanes number at least six and further comprising:

a second control link;

a fourth rod pivotally coupled to a fourth one of said vanes and pivotally coupled to said second control link;

a fifth rod pivotally coupled to a fifth one of said vanes and pivotally coupled to said second control link;

a sixth rod pivotally coupled to a sixth one of said vanes and pivotally coupled to said second control link.

42. The apparatus of claim 41, wherein said first control link is configured to rotate about a first axis and said second control link is configured to rotate about a second axis generally parallel to said first axis to adjust a thrust vector provided by said vanes.

43. The apparatus of claim 42, further comprising a rotary actuator pivotally connected to each of said first and second control links, said rotary actuator being configured to controllably adjust a separation distance between said first control link and said second control link to selectively coverge said vanes.

44. An apparatus, comprising:

a plurality of vanes configured to pivot about a corresponding rotational axis to direct flow of working fluid being discharged to provide thrust; and a means for controllably pivoting said vanes to adjust convergence of said vanes and a thrust vector provided by said vanes with a control link pivotally coupled to said vanes, said control link having two degrees of freedom of movement corresponding to a first position coordinate and a second position coordinate, said control link adjusting the convergence of said vanes in accordance with said first position coordinate, and said control link adjusting said thrust vector in accordance with said second position coordinate.

* * * * *